United States Patent
Liu

(10) Patent No.: US 9,137,838 B2
(45) Date of Patent: *Sep. 15, 2015

(54) DIRECT DATA COMMUNICATION IN INFRASTRUCTURE MODE IN WIRELESS COMMUNICATION SYSTEMS

(71) Applicant: QUALCOMM Incorporated, San Diego, CA (US)

(72) Inventor: Xiangyang Liu, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/049,661

(22) Filed: Oct. 9, 2013

(65) Prior Publication Data

US 2014/0036898 A1 Feb. 6, 2014

Related U.S. Application Data

(63) Continuation of application No. 12/768,434, filed on Apr. 27, 2010, now Pat. No. 8,588,156.

(51) Int. Cl.
*H04W 76/02* (2009.01)
*H04W 36/00* (2009.01)
*H04W 84/12* (2009.01)

(52) U.S. Cl.
CPC ........ *H04W 76/023* (2013.01); *H04W 36/0022* (2013.01); *H04W 84/12* (2013.01)

(58) Field of Classification Search
CPC .......... H04W 76/023; H04W 36/0022; H04W 76/025; H04W 36/0066; H04W 84/12
USPC ................. 370/338, 349, 252, 312, 337, 331, 370/395.3, 401, 329, 254, 389, 392, 354, 370/352
See application file for complete search history.

(56) References Cited

U.S. PATENT DOCUMENTS 5,754,870 A 5/1998 Pollard
6,192,230 B1 2/2001 Van Bokhorst et al.
(Continued)

FOREIGN PATENT DOCUMENTS

EP 2157739 A1 2/2010
WO 2012078379 6/2012
WO 2013134389 9/2013

OTHER PUBLICATIONS

Co-pending U.S. Appl. No. 13/955,779, filed Jul. 31, 2013, 44 pages.
(Continued)

*Primary Examiner* — Hanh N Nguyen
(74) *Attorney, Agent, or Firm* — DeLizio Law, PLLC

(57) ABSTRACT

In an infrastructure wireless network, a direct data communication mechanism can be implemented for wireless network devices in a common basic service set (BSS) to directly exchange data frames, without transmitting the data frames via an access point. Each of the wireless network devices in the BSS can receive connection information that indicates whether data frames can be directly transmitted to each of the wireless network devices in the BSS. A source wireless network device can determine whether the data frames can be directly transmitted to a destination wireless network device based on analyzing the connection information. If the data frames can be directly transmitted, the source wireless network device can directly transmit the data frames to the destination WLAN device without having to transmit the data frames to the access point, which may improve transmission efficiency.

19 Claims, 5 Drawing Sheets

(56) References Cited

U.S. PATENT DOCUMENTS

| | | | |
|---|---|---|---|
| 6,421,714 B1 | 7/2002 | Rai et al. | |
| 6,570,857 B1 | 5/2003 | Haartsen et al. | |
| 6,580,704 B1* | 6/2003 | Wellig et al. | 370/338 |
| 6,829,493 B1 | 12/2004 | Hunzinger | |
| 6,836,472 B2 | 12/2004 | O'toole et al. | |
| 7,260,068 B2 | 8/2007 | Hsieh et al. | |
| RE40,032 E | 1/2008 | Van Bokhorst et al. | |
| 7,457,271 B2 | 11/2008 | Donovan | |
| 7,457,973 B2 | 11/2008 | Liu | |
| 7,505,795 B1 | 3/2009 | Lim et al. | |
| 7,567,815 B2 | 7/2009 | Nishikawa et al. | |
| 7,577,114 B2 | 8/2009 | Hsieh et al. | |
| 7,634,275 B2 | 12/2009 | Odman | |
| 7,751,356 B2 | 7/2010 | Kim et al. | |
| 7,804,849 B2 | 9/2010 | Mahany et al. | |
| 7,864,720 B2 | 1/2011 | Jeyaseelan | |
| 7,881,755 B1 | 2/2011 | Mishra et al. | |
| 7,916,663 B2 | 3/2011 | Yee | |
| 7,978,638 B2 | 7/2011 | Kim et al. | |
| 7,995,507 B2 | 8/2011 | Singh et al. | |
| 8,014,370 B2 | 9/2011 | Banerjea et al. | |
| 8,023,522 B2 | 9/2011 | Gobriel et al. | |
| 8,045,494 B2 | 10/2011 | Habetha et al. | |
| 8,064,474 B2 | 11/2011 | Lynch et al. | |
| 8,072,913 B2 | 12/2011 | Desai | |
| 8,094,595 B2 | 1/2012 | Montojo et al. | |
| 8,098,635 B2 | 1/2012 | Montojo et al. | |
| 8,099,047 B2 | 1/2012 | David et al. | |
| 8,112,650 B2 | 2/2012 | Qing et al. | |
| 8,233,456 B1 | 7/2012 | Kopikare | |
| 8,233,462 B2 | 7/2012 | Walton et al. | |
| 8,526,346 B1* | 9/2013 | Liu | 370/311 |
| 8,537,733 B1 | 9/2013 | Panneerselvam et al. | |
| 8,542,620 B2 | 9/2013 | Sampathkumar | |
| 8,576,761 B1 | 11/2013 | Pitchaiah | |
| 8,588,156 B1* | 11/2013 | Liu | 370/329 |
| 8,611,268 B1 | 12/2013 | Thandaveswaran | |
| 8,744,496 B2 | 6/2014 | Cave et al. | |
| 8,755,313 B2 | 6/2014 | Damnjanovic et al. | |
| 9,049,658 B2 | 6/2015 | Ponmudi et al. | |
| 2002/0045435 A1 | 4/2002 | Fantaske | |
| 2002/0164963 A1 | 11/2002 | Tehrani et al. | |
| 2004/0259542 A1 | 12/2004 | Viitamaki et al. | |
| 2005/0135284 A1 | 6/2005 | Nanda et al. | |
| 2005/0136914 A1 | 6/2005 | Van Kampen et al. | |
| 2005/0152324 A1 | 7/2005 | Benveniste | |
| 2005/0286454 A1 | 12/2005 | Morimoto et al. | |
| 2006/0029024 A1 | 2/2006 | Zeng et al. | |
| 2006/0292987 A1 | 12/2006 | Ophir et al. | |
| 2007/0057767 A1 | 3/2007 | Sun et al. | |
| 2007/0077936 A1 | 4/2007 | Tomisawa et al. | |
| 2007/0082688 A1 | 4/2007 | Tu et al. | |
| 2007/0171910 A1 | 7/2007 | Kumar et al. | |
| 2007/0248066 A1 | 10/2007 | Banerjea et al. | |
| 2008/0069021 A1 | 3/2008 | Chhabra | |
| 2008/0095134 A1 | 4/2008 | Chen et al. | |
| 2009/0016248 A1 | 1/2009 | Li et al. | |
| 2009/0034443 A1 | 2/2009 | Walker et al. | |
| 2009/0073945 A1 | 3/2009 | Seok | |
| 2009/0097438 A1 | 4/2009 | Kneckt et al. | |
| 2009/0196211 A1 | 8/2009 | Wentink | |
| 2009/0279467 A1 | 11/2009 | Ji | |
| 2009/0296615 A1 | 12/2009 | Kim et al. | |
| 2009/0310578 A1* | 12/2009 | Convertino et al. | 370/338 |
| 2009/0312073 A1 | 12/2009 | Park et al. | |
| 2010/0061272 A1 | 3/2010 | Veillette | |
| 2010/0070767 A1 | 3/2010 | Walker et al. | |
| 2010/0093378 A1 | 4/2010 | Chin et al. | |
| 2010/0118797 A1 | 5/2010 | Park et al. | |
| 2010/0128701 A1 | 5/2010 | Nagaraja | |
| 2010/0153727 A1 | 6/2010 | Reznik et al. | |
| 2010/0189021 A1 | 7/2010 | He et al. | |
| 2010/0246591 A1 | 9/2010 | Gobriel et al. | |
| 2010/0254290 A1 | 10/2010 | Gong et al. | |
| 2010/0284316 A1 | 11/2010 | Sampathkumar | |
| 2010/0304780 A1 | 12/2010 | Chung et al. | |
| 2010/0325459 A1 | 12/2010 | Kangude et al. | |
| 2011/0051638 A1 | 3/2011 | Jeon et al. | |
| 2011/0086662 A1 | 4/2011 | Fong et al. | |
| 2011/0122835 A1 | 5/2011 | Naito et al. | |
| 2011/0158142 A1 | 6/2011 | Gong et al. | |
| 2011/0161697 A1 | 6/2011 | Qi et al. | |
| 2011/0237294 A1 | 9/2011 | Hussain | |
| 2011/0280170 A1 | 11/2011 | Bowser et al. | |
| 2012/0021735 A1 | 1/2012 | Maeder et al. | |
| 2012/0151089 A1 | 6/2012 | Ponmudi et al. | |
| 2013/0028206 A1 | 1/2013 | Cho et al. | |
| 2013/0201936 A1 | 8/2013 | Chen et al. | |
| 2013/0204936 A1 | 8/2013 | El et al. | |
| 2013/0238919 A1 | 9/2013 | Ponmudi et al. | |
| 2013/0315121 A1 | 11/2013 | Sampathkumar | |
| 2013/0329618 A1 | 12/2013 | Panneerselvam et al. | |

OTHER PUBLICATIONS

Co-pending U.S. Appl. No. 13/966,870, filed Sep. 14, 2013, 47 pages.
Co-pending U.S. Appl. No. 12/562,819, filed Sep. 18, 2009.
Co-pending U.S. Appl. No. 12/727,610, filed Mar. 19, 2010.
Co-pending U.S. Appl. No. 12/768,434, filed Apr. 27, 2010.
Co-pending U.S. Appl. No. 12/963,160, filed Dec. 8, 2010.
Co-pending U.S. Appl. No. 13/088,081, filed Apr. 15, 2011.
Co-pending U.S. Appl. No. 13/413,011, filed Mar. 6, 2012.
IEEE Standard for Information technology—Telecommunications and information exchange between systems—Local and metropolitan area networks—Specific requirements—Part 11: Wireless LAN Medium Access Control (MAC) and Physical Layer (PHY) Specifications, IEEE Std 802.1-2007 (Revision of IEEE Std 802.11-1999) http://standards.ieee.org/getieee802/download/802.11-2007.pdf. (Date Obtained from Internet Oct. 21, 2009) Jun. 12, 2007, pp. 59-312.
IEEE Standard for Information technology—Telecommunications and information exchange between systems—Local and metropolitan area networks—Specific requirements—Part 11: Wireless LAN Medium Access Control (MAC) and Physical Layer (PHY) Specifications, IEEE Std 802.11-2007 (Revision of IEEE Std 802.11-1999) Section 11; http://standards.ieee.org/getieee802/download/802.11-2007.pdf. (Date Obtained from Internet Apr. 6, 2010) Jun. 12, 2007, pp. 468-517.
IEEE Standard for Information technology—Telecommunications and information exchange between systems—Local and metropolitan area networks—Specific requirements—Part 11: Wireless LAN Medium Access Control (MAC) and Physical Layer (PHY) Specifications, IEEE Std 802.11-2007 (Revision of IEEE Std 802.11-1999) Section 5; http://standards.ieee.org/getieee802/download/802.11-2007.pdf. (Date Obtained from Internet Apr. 6, 2010) Jun. 12, 2007, pp. 72-99.
"IEEE Std 802.11z: IEEE Standard for Information Technology—Amendment 7: Extensions to Direct-Link Setup", IEEE Computer Society 3 Park Avenue New York, NY 10016-5997 http://ieeexplore.ieee.org/xpl/freeabsalljsp"amumber=5605400 Oct. 14, 2010, 96 pages.
Jung Eun-Sun et al., "A Power Control MAC Protocol for Ad Hoc Networks", 2002, 12 pages.
Co-pending U.S. Appl. No. 12/768,912, filed Apr. 28, 2010.
Co-pending U.S. Appl. No. 12/705,267, filed Feb. 12, 2010.
IEEE Standard for Information Technology—Telecommunications and information exchange between systems—Local and metropolitan area networks—Specific requirements", Part 11: Wireless LAN Medium Access Control (MAC) and Physical Layer (PHY) specifications Amendment 7: Extensions to Direct-Link Setup (DLS) Standard, IEEE, Piscataway, NJ. USA, Oct. 14, 2010. Aug. 20, 1999, pp. 1-122.
"PCT Application No. PCT/US11/62154 International Preliminary Report on Patentability", Jun. 20, 2013 , 8 pages.
"PCT Application No. PCT/US2011/062154 International Search Report", Mar. 6, 2012 , 13 pages.
"PCT Application No. PCT/US2013/029377 International Search Report", Jun. 17, 2013 , 11 pages.
"U.S. Appl. No. 12/492,405 Office Action", Sep. 27, 2012, 10 pages.

(56) References Cited

OTHER PUBLICATIONS

"U.S. Appl. No. 12/492,405 Office Action", Mar. 15, 2012, 9 pages.
"U.S. Appl. No. 12/562,819 Final Office Action", May 3, 2012, 32 pages.
"U.S. Appl. No. 12/562,819 Office Action", Nov. 14, 2011, 26 pages.
"U.S. Appl. No. 12/562,819 Office Action", Feb. 5, 2013, 29 pages.
"U.S. Appl. No. 12/705,267 Office Action", Mar. 22, 2012, 11 pages.
"U.S. Appl. No. 12/727,610 Office Action", Dec. 5, 2013, 16 pages.
"U.S. Appl. No. 12/727,610 Final Office Action", Jan. 7, 2013, 24 pages.
"U.S. Appl. No. 12/727,610 Office Action", Aug. 2, 2012, 20 pages.
"U.S. Appl. No. 12/768,434 Final Office Action", Mar. 20, 2013, 15 pages.
"U.S. Appl. No. 12/768,434 Office Action", Oct. 15, 2012, 11 Pages.
"U.S. Appl. No. 12/768,912 Final Office Action", Feb. 22, 2013, 27 Pages.
"U.S. Appl. No. 12/768,912 Office Action", Sep. 7, 2012, 23 pages.
"U.S. Appl. No. 12/963,160 Office Action", Apr. 16, 2013, 25 pages.
"U.S. Appl. No. 12/963,160 Final Office Action", Aug. 15, 2013, 19 pages.
"U.S. Appl. No. 13/088,081 Non-Final Office Action", Apr. 24, 2013, 14 Pages.
"Wireless LAN Medium Access Control (MAC) and Physical Layer (PHY) Specifications", IEEE Standard for Information Technology Section 11.0, http://standards.ieee.org/getieee802/download/802.11-2007.pdf Jun. 12, 2007, pp. 419-468.
"Wireless LAN Medium Access Control (MAC) and Physical Layer (PHY) Specifications", IEEE Standard for Information Technology Section 7.0, http://standards.ieee.org/getieee802/download/802.11-2007.pdf Jun. 12, 2007, pp. 59-154.
"U.S. Appl. No. 12/963,160 Office Action", Jan. 6, 2014, 20 pages.
"IEEE Standard for Information TechnologyTelecommunications and information exchange between systemsLocal and metropolitan area networksSpecific requirements", IEEE Std 802,11z™,2010, Aug. 15, 2014, 96 pages.
"U.S. Appl. No. 12/727,610 Final Office Action", Nov. 4, 2014, 18 pages.
"Peer-to-Peer Technical Group, Peer-to-Peer Technical Specification", Revision 1.0, May 12, 2009, 105 Pages.
"U.S. Appl. No. 12/727,610 Final Office Action", Jul. 7, 2014, 17 pages.
"U.S. Appl. No. 12/963,160 Final Office Action", Jul. 30, 2014, 21 Pages.
"U.S. Appl. No. 13/413,011 Office Action", Jul. 30, 2014, 15 Pages.
"IN Application No. 1177/MUM/2009 First Examiner Report", Sep. 11, 2014, 3 pages.
"U.S. Appl. No. 13/955,779 Office Action", May 13, 2015, 21 pages.

* cited by examiner

_(1)_

DIRECT DATA COMMUNICATION IN INFRASTRUCTURE MODE IN WIRELESS COMMUNICATION SYSTEMS

RELATED APPLICATIONS

This application is a Continuation of U.S. application Ser. No. 12/768,434 filed Apr. 27, 2010.

BACKGROUND

Embodiments of the inventive subject matter generally relate to the field of wireless communication and, more particularly, to direct data communication in an infrastructure mode in wireless communication systems.

An infrastructure mode in a wireless local area network (WLAN) ("infrastructure WLAN") provides a mechanism for WLAN devices to communicate with each other via a centralized connection point (i.e., an access point). For a source WLAN device to communicate with a destination WLAN device in the infrastructure WLAN, the source WLAN device first transmits data frames to the access point. The access point then transmits the received data frames to the destination WLAN device.

SUMMARY

Various embodiments for implementing direct data communication in an infrastructure mode in wireless communication systems are disclosed. In one embodiment, it is determined at a first wireless network device of a wireless communication network operating in an infrastructure mode, that a data frame is scheduled to be transmitted from the first wireless network device to a second wireless device of the wireless communication network. Then, it is determined whether the data frame can be directly transmitted to the second wireless network device based on connection information received in a beacon frame from an access point of the wireless communication network. The connection information comprises an indication of whether data frames can be directly transmitted to the second wireless network device. The data frame is directly transmitted to the second wireless network device, in response to determining that the data frame can be directly transmitted from the first wireless network device to the second wireless network device. The data frame is transmitted to the access point for transmission to the second wireless network device via the access point, in response to determining that the data frame cannot be directly transmitted from the first wireless network device to the second wireless network device.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to direct data communication between WLAN devices, techniques for direct data communication as described herein may be implemented for other wireless standards and devices, e.g., WiMAX, ZigBee®, Wireless USB devices, etc. In other instances, well-known instruction instances, protocols, structures, and techniques have not been shown in detail in order not to obfuscate the description.

Typical operations for data communication in an infrastructure WLAN involve a source WLAN device transmitting a data frame to a destination WLAN device via an access point. The source WLAN device transmits the data frame to the access point, which, in turn, transmits the data frame to the destination WLAN device. In other words, communication between the source WLAN device and the destination WLAN device involves at least two transmissions of the same data frame. This results in an increase in transmission overhead and consequently results in transmission inefficiency.

Functionality can be implemented so that the WLAN devices in the infrastructure WLAN can directly exchange data frames, without first transmitting the data frames to the access point. The access point in the infrastructure WLAN can be configured to transmit a beacon frame to notify each WLAN device of the other WLAN devices in the infrastructure WLAN. The access point can broadcast device identifiers of the WLAN devices in the infrastructure WLAN and an indication of whether the WLAN devices can directly receive the data frames (i.e., without transmission via the access point). Based on this information obtained from the access point, a source WLAN device can determine whether a destination WLAN device can directly receive data frames. If so, the source WLAN device can directly transmit the data frames to the destination WLAN device without having to transmit the data frames to the access point. Such a direct data communication between WLAN devices in the infrastructure WLAN can reduce transmission overhead and can also improve transmission efficiency.

Figure 1:
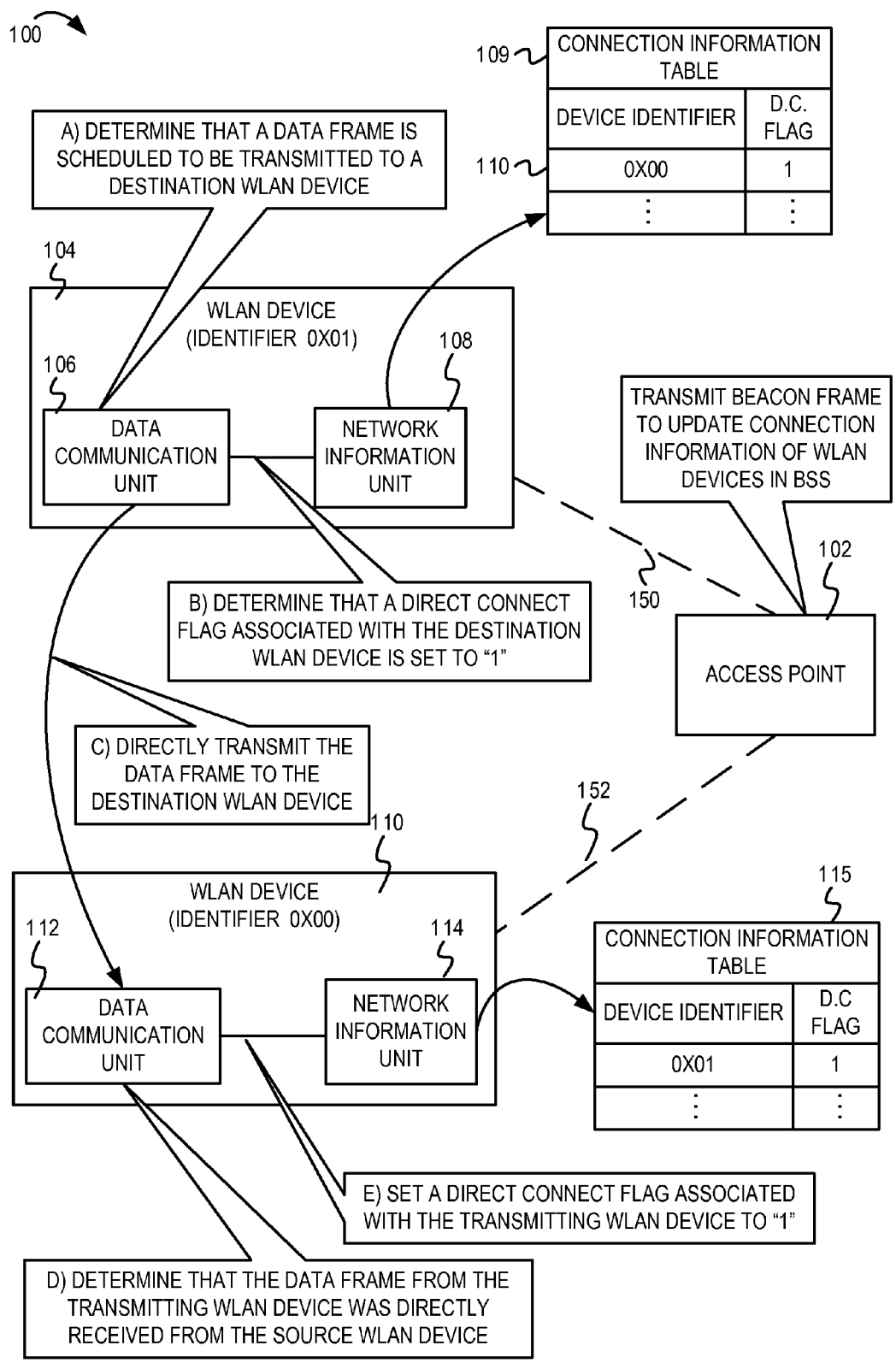
FIG. 1 is a conceptual diagram illustrating example operations for direct data transmission in an infrastructure wireless system.

FIG. 1 is a conceptual diagram illustrating example operations for direct data transmission in an infrastructure WLAN. FIG. 1 depicts an access point 102, a WLAN device 104, and a WLAN device 110. The WLAN device 104 wirelessly connects to communicate with the access point 102 as depicted by a dashed line 150 between the WLAN device 104 and the access point 102. The WLAN device 110 also wirelessly connects to communicate with the access point 102 as depicted by a dashed line 152 between the WLAN device 110 and the access point 102. The access point 102, the WLAN device 104, and the WLAN device 110 together are part of a basic service set (BSS) 100 in the infrastructure WLAN. In an infrastructure mode, the BSS constitutes an access point and WLAN devices associated with (i.e., connected to) the access point. The WLAN devices in one BSS can communicate with each other via the access point. The WLAN devices in one BSS can also communicate with WLAN devices in another BSS via their respective access points. As illustrated, in one example, the WLAN device 104 comprises a data communication unit 106 and a network information unit 108. The WLAN device 110 comprises a data communication unit 112 and a network information unit 114.

Figure 2A:
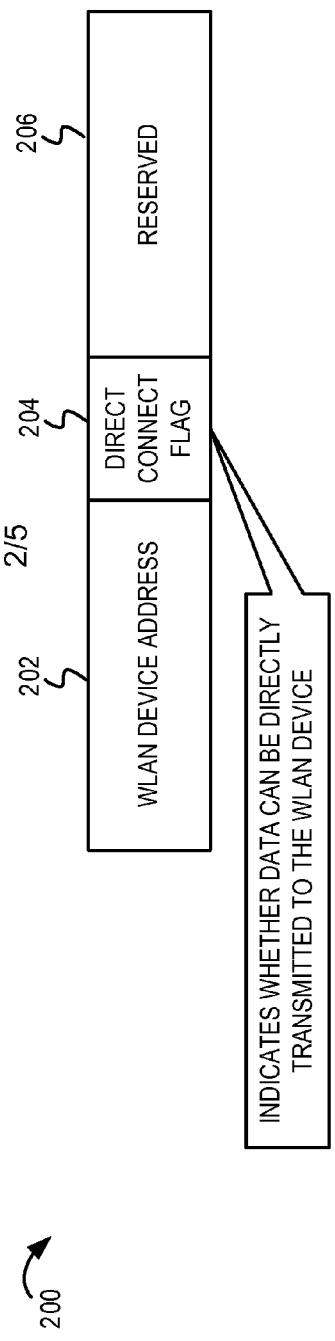
FIG. 2A illustrates an example format of a connected devices field for communicating connection information associated with the WLAN devices in the BSS.

In some embodiments, the access point 102 transmits a beacon frame, at each beacon interval, to update connection information of the WLAN devices 104 and 110 in the BSS 100. The access point 102 indicates a device identifier (e.g., a MAC address) of each WLAN device in the BSS 100, and also indicates whether each WLAN device can directly receive data frames from another WLAN device. FIG. 2A illustrates an example format of a connected devices field 200 in a beacon frame used for broadcasting the connection information associated with the WLAN devices 104 and 110 in the BSS 100. As depicted in FIG. 2A, in one example, the connected devices field 200 comprises a WLAN device address field 202, a direct connect flag 204, and reserved fields 206. The WLAN device address field 202 can indicate a medium access control (MAC) address of the WLAN device or other suitable network/device identifier that uniquely identifies the WLAN device. The direct connect flag 204 indicates whether or not the WLAN device can be reached directly by another WLAN device in the BSS 100. In one example, a value of "1" transmitted in the direct connect flag (i.e., direct connect flag=1) can indicate that the WLAN device can be reached directly by another WLAN device in the BSS 100. A value of "0" transmitted in the direct connect flag (i.e., direct connect flag=0) can indicate that the WLAN device cannot be reached directly by another WLAN device in the BSS 100. In some implementations, the access point 102 may transmit a default value of "1" in the direct connect flag 204 to indicate that all the WLAN devices in the BSS 100 can directly receive data frames. In other implementations, each WLAN device in the BSS 100 may indicate, to the access point 102, whether it can directly receive the data frames from other WLAN devices. It is noted, however, that in other implementations, the connected devices field 200 may not comprise the direct connect flag 204. In these embodiments, the WLAN devices may initially store a default direct connect value of "1" to indicate the other WLAN devices can directly receive data frames, and then update the direct connect value accordingly based on whether attempts to directly communicate with the WLAN devices are successful.

The access point 102 can transmit the connection information associated with the WLAN devices 104 and 110 connected to the access point 102 in the beacon frame. The access point 102 may update the beacon frame (e.g., vary the length of the beacon frame, etc.) based on a number of WLAN devices connected to the access point 102. In one implementation, existing reserved fields in the beacon frame (not shown) may be used to transmit the connection information associated with the WLAN devices in the BSS 100. In another implementation, one or more connected devices fields 200 may be appended to legacy beacon frame formats to indicate the connection information associated with the WLAN devices 104 and 110. In one implementation, one connected devices field 200 may be allocated for each WLAN device in the BSS 100. For example, if the BSS 100 comprises two WLAN devices, two connected devices fields 200 may be appended to the legacy beacon frame. The first connected device field 200 may indicate the connection information associated with the first WLAN device and the second connected device field 200 may indicate the connection information associated with the second WLAN device.

Each WLAN device in the BSS 100 can receive the beacon frame, read the connected devices field 200, and can store the connection information associated with each of the other WLAN devices in the BSS 100. For example, from the beacon frame, the WLAN device 104 may determine and store the connection information associated with the WLAN device 110. It is noted, however, that in other examples, the BSS 100 may include other WLAN devices in addition to the WLAN devices 104 and 110.

In one embodiment, at stage A, the data communication unit 106 in a source WLAN device 104 determines that a data frame is scheduled to be transmitted to a destination WLAN device 110. The data communication unit 106 may access a transmit data buffer (not shown) to determine that the data frame is scheduled to be transmitted to the destination WLAN device 110. The data communication unit 106 may also determine that the device identifier of the destination WLAN device 110 is 0x00.

At stage B, the data communication unit 106 determines that a direct connect flag associated with the destination WLAN device 110 is set to "1". The direct connect flag can indicate whether the WLAN device associated with the direct connect flag can be reached directly (i.e., whether data frames can be directly transmitted to the WLAN device). The data communication unit 106 may query the network information unit 108 to determine the status of the direct connect flag associated with the destination WLAN device 110. For example, the data communication unit 106 may provide the device identifier (e.g., 0x00) of the destination WLAN device 110 to the network information unit 108. The network information unit 108 can access a connection information table 109 (or other suitable data structure) and can identify an entry 110 corresponding to the device identifier of the destination WLAN device 110 in the connection information table. From the entry 110, the network information unit 108 can determine, and accordingly notify the data communication unit 106, that the direct connect flag associated with the destination WLAN device 110 is set to "1". The direct connect flag associated with the destination WLAN device 110 being set to "1" can indicate that the source WLAN device 104 can directly transmit the data frame to the destination WLAN device 110.

It is also noted that in some implementations, prior to determining whether the direct connect flag associated with the destination WLAN device 110 is set to "1", the network information unit 108 can determine whether the destination WLAN device 110 and the source WLAN device 104 belong to the same BSS 100. If so, the network information unit 108 may access the connection information table 109 and determine whether the direct connect flag associated with the destination WLAN device 110 is set to "1". Otherwise, the network information unit 108 may indicate to the data communication unit 106 that the data frame cannot be directly transmitted to the destination WLAN device 110.

Figure 2B:
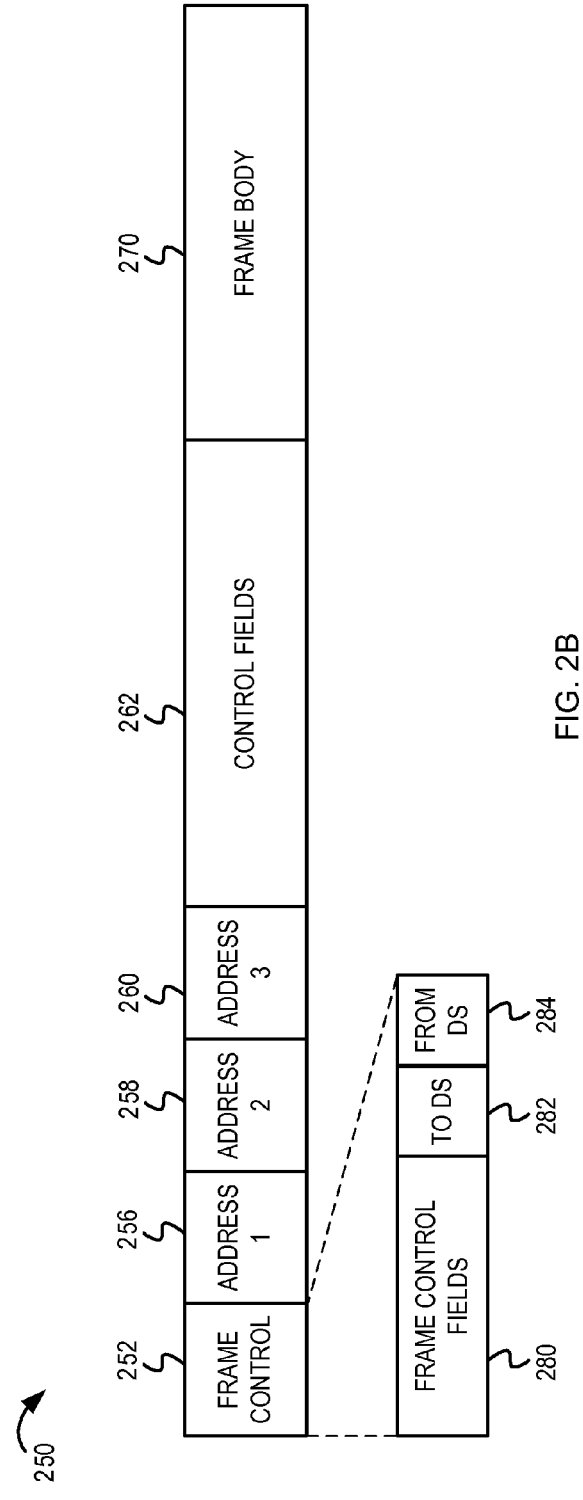
FIG. 2B illustrates an example format of a data frame that is transmitted to the destination WLAN device.

At stage C, the data communication unit 106 directly transmits the data frame to the destination WLAN device 110. FIG. 2B illustrates an example format of a data frame 250 that is transmitted to the destination WLAN device 110. The data frame 250 comprises a frame control field 252, a first address field 256, a second address field 258, a third address field 260, control fields 262, and, a frame body 270. The frame control field 252 comprises frame control fields 280, a "To" distribution system (DS) field 284, and a "From" DS field 286. The frame control fields 280 comprises various fields for indicating a transmission protocol (e.g., an 802.11 protocol version), a type of frame being transmitted (e.g., 0000 can be transmitted to indicate a data frame), etc. The "To" DS field 284 and the "From" DS field 286, respectively, indicate whether the data frame 250 is destined for the distribution system (i.e., the access point 102) or transmitted from the distribution system. The address fields typically indicate the address (e.g., MAC address or other device identifier) of the source WLAN device 104, the address of the destination WLAN device 110, an identifier (e.g., a service set identifier or SSID) of the access point 102, etc. In FIG. 1, the data communication unit 106 determines that the data frame can be directly transmitted to the destination WLAN device 110. Therefore, the data communication unit 106 can indicate the address of the destination device 110 (e.g., the device identifier 0x00) in the first address field 256, the address of the source WLAN device 104 (e.g., the device identifier 0x01) in the second address field 258, and the identifier of the access point 102 in the third address field 260. The data communication unit 106 may also set the "To" DS field 284 and the "From" DS field 280 in the frame control field 252 to "0" to indicate that the source WLAN device 104 will directly transmit the data frame to the destination WLAN device 110. The control fields 262 can comprise additional address fields, can indicate quality of service (QoS) information, can indicate communication medium access durations, etc. The frame body 270 can comprise the information scheduled to be transmitted to the destination WLAN device 110. It is noted, however, that in other embodiments the data communication unit 106 can be configured to transmit any suitable values in the address fields 256, 258, and 260 and in the frame control field 252 to indicate that the data frame is being transmitted directly by the source WLAN device 104 to the destination WLAN device 110. Moreover, it should be understood that the data frame format 250 depicted in FIG. 2B is an example. Depending on the type of data to be transmitted, some fields depicted in the data frame 250 may not be used, the data frame 250 may comprise additional fields, and/or the length of the data fields may vary.

At stage D, the data communication unit 112 in the destination WLAN device 110 receives the data frame from the source WLAN device 104 and determines that the source WLAN device 104 transmitted the data frame directly to the destination WLAN device 110. The data communication unit 112 may read the address fields 256, 258, and 260 in the received data frame 250 and may determine whether the data frame was transmitted by the access point 102 or by another WLAN device in the BSS 100. For example, the data communication unit 112 may determine that second address field 258 indicates the address of the source WLAN device 110 and that the third address field 260 indicates the identifier of the access point 102. This can serve as an indication that the source WLAN device 104 directly transmitted the data frame to the destination WLAN device 110. The data communication unit 112 may also determine that the received data frame 250 was directly transmitted by the source WLAN device 104 based on reading the "To" DS field 282 and the "From" DS field 284 in the frame control field 252. For example, the data communication unit 112 may determine that the "To" DS field 282 and the "From" DS field 284 are set to "0". This can serve as an indication that the access point 102 did not transmit the data frame to the WLAN device 110.

At stage E, the network information unit 114 sets a direct connect flag associated with the source WLAN device 104 to "1". On determining that the source WLAN device 104 directly transmitted the data frame, the data communication unit 112 can notify the network information unit 114 to update the direct connect flag associated with the source WLAN device 104. Receiving the data frame directly from the source WLAN device 104 can serve as an indication that the source WLAN device 104 can also directly receive data frames from the destination WLAN device 110. In one example, the data communication unit 112 can provide the device identifier associated with the source WLAN device 104 to the network information unit 114 and can direct the network information unit 114 to set the direct connect flag associated with the source WLAN device to "1". The network information unit 114 can, in turn, access its connection information table 115 and set the direct connect flag associated with the source WLAN device to "1".

It is noted, however, that in some circumstances the network information unit 108 may indicate, to the data communication unit 106, that the data frame cannot be directly transmitted to the destination WLAN device 110. For example, the network information unit 108 may determine that the data frame cannot be directly transmitted to the destination WLAN device 110 if the network information unit 108 cannot locate the device identifier associated with the destination WLAN device 110 in the connection information table 109. As another example, the network information unit 108 may also determine that the data frame cannot be directly transmitted to the destination WLAN device 110 if the network information unit 108 determines that the destination WLAN device 110 is not in the same BSS 100 as the source WLAN device 104 (i.e., if the destination WLAN device 110 and the source WLAN device 104 are not connected to the same access point 102). As yet another example, the network information unit 108 may determine that the data frame cannot be directly transmitted to the destination WLAN device 110 if it is determined that the direct connect flag associated with the destination WLAN device 110 is set to "0" (i.e., the destination WLAN device 110 is configured to only exchange data frames with other WLAN devices via the access point 102). In such cases, the data communication unit 106 of the source WLAN device 104 can transmit the data frame to the access point 102. In the data frame format 250 of FIG. 2B, the data communication unit 106 can set the "To" DS field 282 to "1", the "From" DS field 284 to "0", the first address field 256 to the identifier of the access point 102, the second address field 258 to the address of the source WLAN device 104, and the third address field 260 to the address of the destination WLAN device 110. On receiving the data frame, the access point 102 can appropriately route the data frame to the destination WLAN device 110 (e.g., via other access points, via an Ethernet network, via other communication networks, etc.).

It also should be noted that although FIG. 1 depicts the network information unit 108 indicating a status of the direct connect flag associated with the destination WLAN device 110, embodiments are not so limited. In some implementations, the network information unit 108 may also implement functionality to update the connection information associated with the connected WLAN devices in the BSS 100 based on analyzing the connected devices field 200 in received beacon frames. The network information unit 108 may also update the connection information associated with the WLAN devices in the BSS 100 based on notifications from the data communication unit 106 (as described in stage E). In some implementations, the network information unit 108 may also communicate with the access point 102 and request connection information updates.

Figure 3:
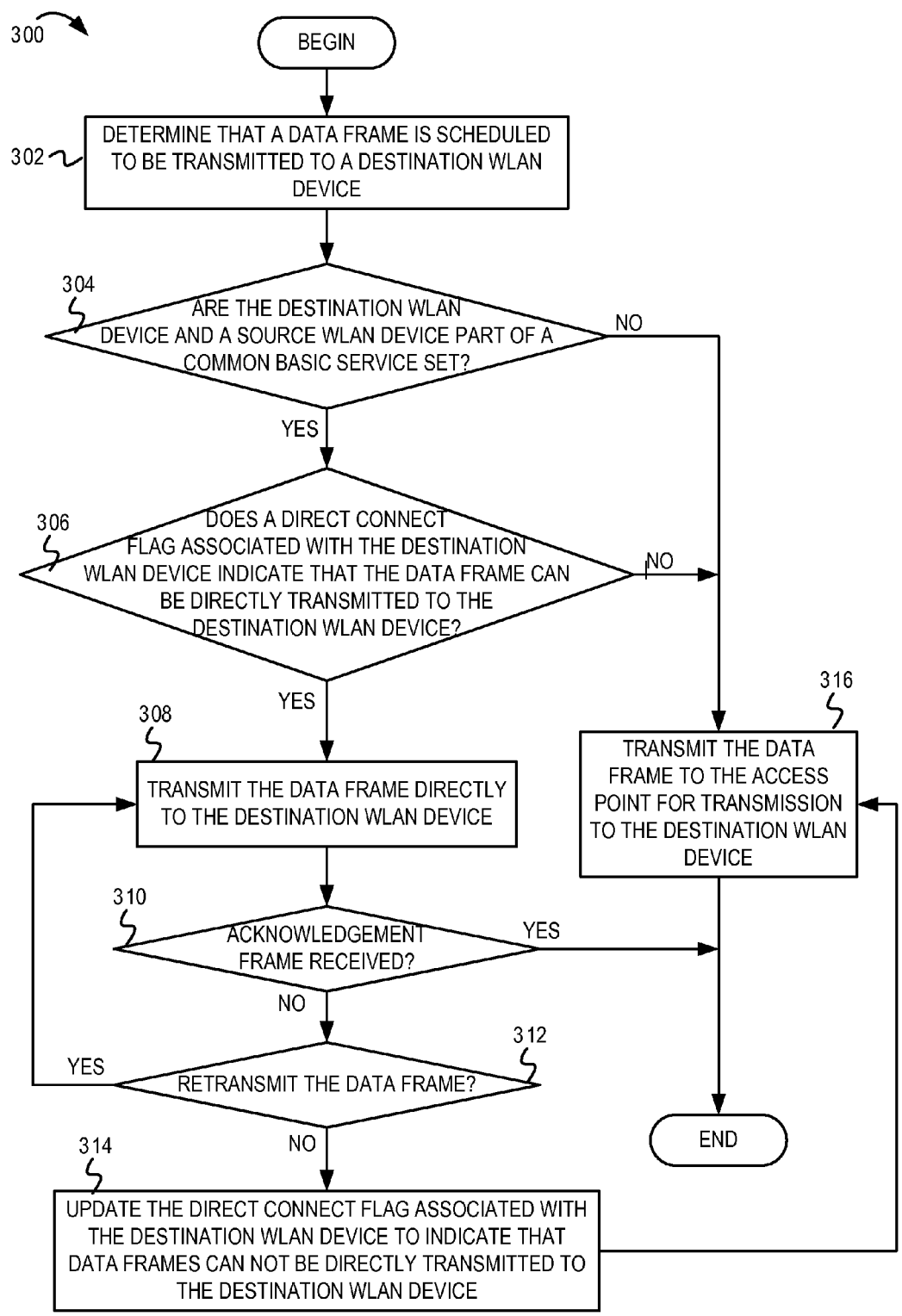
FIG. 3 is a flow diagram illustrating example operations at a source WLAN device for determining whether data frames can be directly transmitted to a destination WLAN device.

FIG. 3 is a flow diagram ("flow") 300 illustrating example operations at a source WLAN device for determining whether data frames can be directly transmitted to a destination WLAN device. The flow 300 begins at block 302.

At block 302, it is determined that a data frame is scheduled to be transmitted to a destination WLAN device. In the example of FIG. 1, the data communication unit 106 of the source WLAN device 104 can determine that the data frame is scheduled to be transmitted to the destination WLAN device 110. The data communication unit 106 may access a transmit data buffer and determine that the data frame is scheduled to be transmitted to the destination WLAN device 110. The data communication unit 106 may also determine a device identifier (e.g., a MAC address) of the destination WLAN device 110. The flow continues at block 304.

At block 304, it is determined whether the destination WLAN device and the source WLAN device are part of a common basic service set (BSS). For example, the data communication unit 106 may determine whether the destination WLAN device 110 and the source WLAN device 104 are part of the same BSS 100. In other words, based on knowledge that the source WLAN device 104 is connected to the access point 102, the data communication unit 106 may determine whether the destination WLAN device 110 is also connected to the access point 102. The data communication unit 106 may query the network information unit 108 to determine whether the destination WLAN device 110 is also connected to the access point 102. The network information unit 108 may access the connection information table 109 to determine whether the connection information table 109 comprises connection information about the destination WLAN device 110. It is noted that as part of a beacon frame, the access point 102 transmits connection information associated with all WLAN devices in the BSS 100. Therefore, absence of the connection information associated with the destination WLAN device 100 in the connection information table 109 can serve as an indication that the destination WLAN device 110 is not connected to the access point 102. If it is determined that the destination WLAN device and the source WLAN device are part of a common BSS, the flow continues at block 306. Otherwise, the flow continues at block 316.

At block 306, it is determined whether a direct connect flag associated with the destination WLAN device indicates that the data frame can be directly transmitted to the destination WLAN device. For example, based on knowledge of the device identifier of the destination WLAN device 110, the network information unit 108 can determine whether the direct connect flag associated with the destination WLAN device 110 indicates that the data frame can be directly transmitted to the destination WLAN device 110. In one implementation, the network information unit 108 can determine whether the direct connect flag associated with the destination WLAN device 110 is set to "1" by accessing the connection information table 109. If the direct connect flag is set to "1", this indicates that the data frame can be directly transmitted to the destination WLAN device 110. Alternately, if the direct connect flag is set to "0", this indicates that the data frame should be transmitted to the destination WLAN device 110 via the access point 102. The network information unit 108 can transmit a notification to the data communication unit 106 indicating whether the data frame can be directly transmitted to the destination WLAN device 110. If it is determined that the direct connect flag associated with the destination WLAN device indicates that the data frame can be directly transmitted to the destination WLAN device, the flow continues at block 308. Otherwise, the flow continues at block 316.

At block 308, the data frame is transmitted directly to the destination WLAN device. For example, the data communication unit 106 transmits the data frame to the destination WLAN device 110. With reference to the data frame 250 of FIG. 2B, the data communication unit 106 can transmit the address of the destination WLAN device in the first address field 256, the address of the source WLAN device 104 in the second address field 258, and an access point identifier in the third address field 260 to indicate that the source WLAN device 104 directly transmitted the data frame to the destination WLAN device 110. The data communication unit 106 can also set the "To" DS field 282 and the "From" DS field 284 in the frame control field 252 to "0" to indicate that the source WLAN device 104 directly transmitted the data frame to the destination WLAN device 110. The flow continues at block 310.

At block 310, it is determined whether an acknowledgment frame was received from the destination WLAN device. For example, the data communication unit 106 determines whether the acknowledgement for the data frame was received from the destination WLAN device 110. The data communication unit 106 may wait for a predefined time interval to receive the acknowledgement frame from the destination WLAN device 110. If it is determined that the acknowledgment frame was not received from the destination WLAN device 110, the flow continues at block 312. Otherwise, if it is determined that the acknowledgement was received from the destination WLAN device 110, the transmission was successful and the flow ends.

At block 312, it is determined whether the data frame should be retransmitted. For example, the data communication unit 106 can determine whether the data frame should be retransmitted to the destination WLAN device 110. In determining whether the data frame should be retransmitted, the data communication unit 106 may determine if a predefined retransmission time interval has expired. Also, the data communication unit 106 may determine if a maximum number of allowable retransmission attempts has been reached. If either the predefined retransmission time interval has expired or the maximum number of retransmission attempts has been reached, the data communication unit 106 can determine not to retransmit the data frame to the destination WLAN device 110. If it is determined that the data frame should be retransmitted, the flow continues at block 308 where the data frame is retransmitted to the destination WLAN device. If it is determined that the data frame should not be retransmitted, the flow continues at block 314.

At block 314, if the direct transmission to the destination WLAN device 110 fails, the direct connect flag associated with the destination WLAN device is updated to indicate that data frames cannot be directly transmitted to the destination WLAN device. For example, the network information unit 108 can update the direct connect flag associated with the destination WLAN device 110 to indicate that the data frames cannot be directly transmitted to the destination WLAN device 110. The network information unit 108 can update the direct connect flag associated with the destination WLAN device 110 in response to receiving a notification from the data communication unit 106 that the direct transmission to the destination WLAN device 110 failed. In one example, the network information unit 108 can set the direct connect flag associated with the destination WLAN device 110 to "0" to indicate that data frames cannot be directly transmitted to the destination WLAN device 110. However, the network information unit 108 can set the direct connect flag associated with the destination WLAN device 110 to other suitable predefined value to indicate that data frames cannot be directly transmitted to the destination WLAN device 110. After determining that the data frame cannot be directly transmitted to the destination WLAN device 110, the data communication unit 106 of the WLAN device 104 can transmit the pending data frame and subsequent data frames intended for the destination WLAN device 110 via the access point 102. From block 314, the flow continues at block 316.

At block 316, the data frame is transmitted to the access point for transmission to the destination WLAN device. For example, the data communication unit 106 transmits the data frame to the access point 102. The flow 300 moves from block 304 to block 316 if the data communication unit 106 determines that the destination WLAN device 110 and the source WLAN device 104 are not part of the same BSS 100. The flow 300 also moves from block 306 to block 316 if the data communication unit 106 determines that the direct connect flag associated with the destination WLAN device 110 indicates that the data frame cannot be directly transmitted to the destination WLAN device 110. Furthermore, the flow 300 moves from block 314 to block 316 if the data communication unit 106 determines that attempts to directly transmit the data frame to the destination WLAN device 110 have failed. The access point 102 can accordingly route the data frame (e.g., via other access points, via ad-hoc WLAN networks, via an Ethernet network, etc.) to the destination WLAN device 110. Alternately, the access point 102 may wait until the destination WLAN device 110 connects to the access point 102. From block 316, the flow ends.

Figure 4:
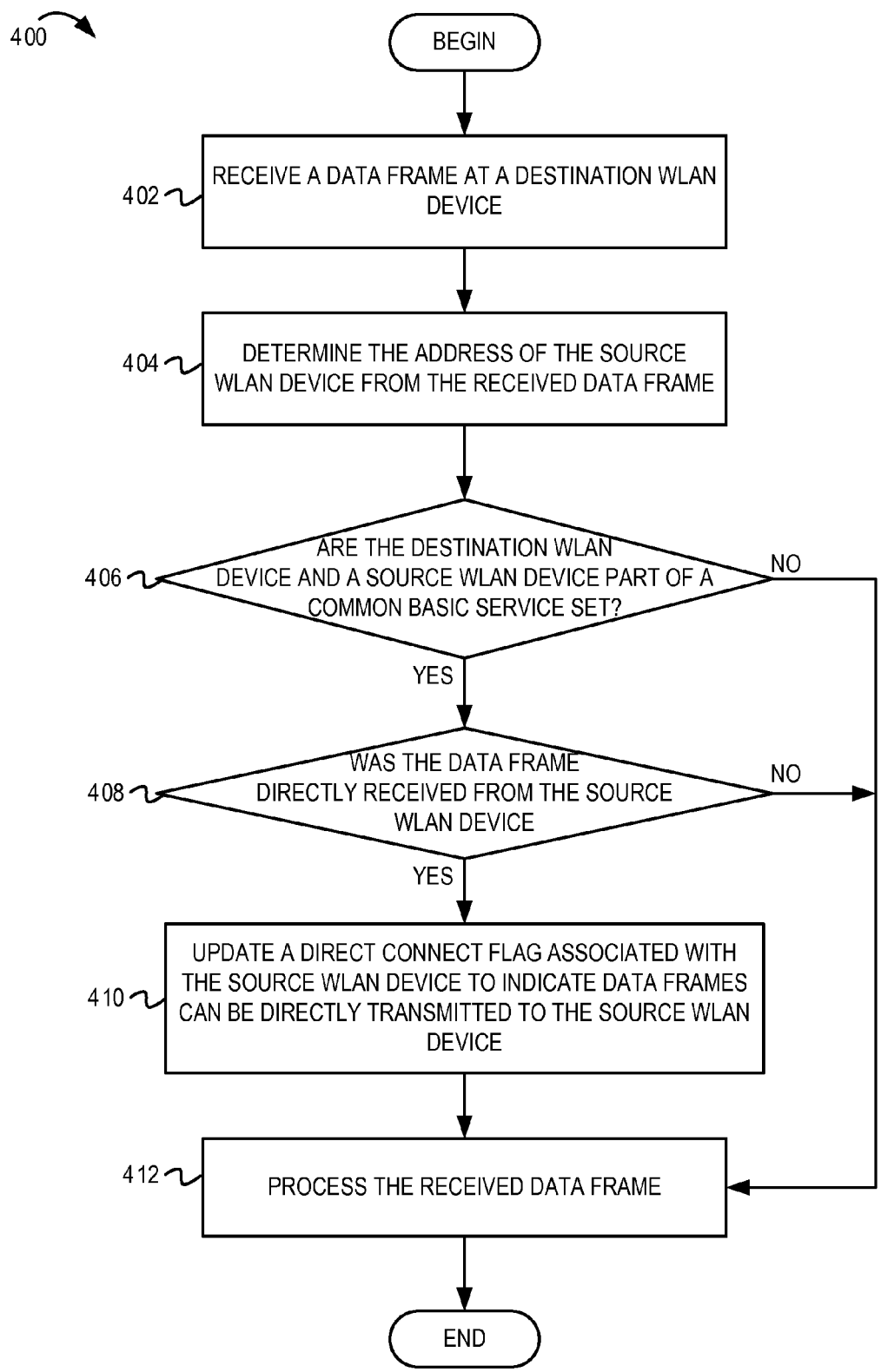
FIG. 4 is a flow diagram illustrating example operations at a destination WLAN device for updating information indicating whether data frames can be directly transmitted to a source WLAN device.

FIG. 4 is a flow diagram 400 illustrating example operations at a destination WLAN device for updating information indicating whether data frames can be directly transmitted to a source WLAN device. The flow 400 begins at block 402.

At block 402, a data frame is received at a destination WLAN device. For example, the data communication unit 112 in the destination WLAN device 110 may receive the data frame. In some implementations, the data communication unit 112 may receive the data frame directly from the source WLAN device 104. In other implementations, the data communication unit 112 may receive the data frame from the access point 102. The flow continues at block 404.

At block 404, the address of the source WLAN device is determined from the received data frame. For example, the data communication unit 112 can determine the address of the source WLAN device 104 from the received data frame. In one implementation, the data communication unit 112 can read the second address field 258 in the received data frame 250 of FIG. 2B and determine the address of the source WLAN device 104. The flow continues at block 406.

At block 406, it is determined whether the destination WLAN device and the source WLAN device are part of a common BSS. For example, the network information unit 114 of the destination WLAN device 110 can determine whether the destination WLAN device 110 and the source WLAN device 104 are part of the same BSS 100. In other words, the network information unit 114 can determine whether both the destination WLAN device 110 and the source WLAN device 104 are connected to the access point 102. The network information unit 114 can access the connection information table 115 comprising a list of device identifiers of WLAN devices connected to the access point 102. The network information unit 114 can determine whether the address of the source WLAN device 104 is listed in the connection information table 115. If it is determined that the destination WLAN device and the source WLAN device are part of the same BSS, the flow contains at block 408. Otherwise, the flow continues at block 410, where the received data frame is processed.

At block 408, it is determined whether the data frame was directly received from the source WLAN device. For example, network information unit 114 can determine whether the data frame was directly received from the source WLAN device 104. The network information unit 114 can read a "To" DS field 282 and a "From" DS field 284 in the frame control field 252 of the data frame 250 and can determine whether the data frame was directly received from the source WLAN device 104. For example, the network information unit 114 can determine that the data frame was directly received from the source WLAN device 104 if the values in the "To" DS field 282 and a "From" DS field 284 are "0". The network information unit 114 may also read the second address field 258 in the received data frame 250 and determine that the source WLAN device 104 directly transmitted the data frame to the destination WLAN device 110. If it is determined that the data frame was directly received from the source WLAN device, the flow continues at block 410. Otherwise, the flow continues at block 412.

At block 410, a direct connect flag associated with the source WLAN device is updated to indicate that data frames can be directly transmitted to the source WLAN device. For example, the network information unit 114 can update the direct connect flag associated with the source WLAN device 104 to indicate that the data frames can be directly transmitted to the source WLAN device 104. In one example, the network information unit 114 can set the direct connect flag associated with the source WLAN device 104 to "1" to indicate that the data frames can be directly transmitted to the source WLAN device 104. However, it is noted that the network information unit 114 can set the direct connect flag associated with the source WLAN device 104 to other suitable predefined values to indicate that data frames can be directly transmitted to the source WLAN device 104. The flow contains at block 412.

At block 412, the received data frame is processed. For example, the data communication unit 112 and/or various other processing components in the destination WLAN device 110 can process the received data frame. From block 412, the flow ends.

It should be understood that the depicted diagrams (FIGS. 1-4) are examples meant to aid in understanding embodiments and should not be used to limit embodiments or limit scope of the claims. Embodiments may perform additional operations, fewer operations, operations in a different order, operations in parallel, and some operations differently. For example, the operations for determining whether the source WLAN device 104 and the destination WLAN device 110 are part of the same BSS (block 304 in FIG. 3) may be performed in conjunction with the operations for determining whether the data frame can be directly transmitted to the destination WLAN device (block 306). In other words, because the access point only transmits connection information for WLAN devices within the BSS 100, the direct connect flag can serve as an indication of whether the source and the destination WLAN devices are part of the same BSS 100 and also whether the data frame can be directly transmitted to the destination WLAN device 110. For example, the source WLAN device 104 can read the direct connect flag associated with the destination WLAN device 110 and determine that the direct connect flag is set to "1". Accordingly, the source WLAN device 104 can confirm that the destination and the source WLAN devices are part of the same BSS and that the data frame can be directly transmitted to the destination WLAN device 110.

In some implementations, if the destination WLAN device 110 determines that the source WLAN device 104 is no longer in the BSS (e.g., has been disconnected from the access point 102, has joined another BSS 100, etc.), the destination WLAN device 110 may remove the source WLAN device 104 from the connection information table 115, may set the direct connect flag associated with the source WLAN device 104 to "0", etc. In another embodiment, however, the destination WLAN device 110 may not have the ability to detect whether a WLAN device has left or joined the BSS 100. The access point 102 can update the connection information to reflect a new WLAN device in the BSS 100 and/or indicate that a WLAN device has left the BSS 100. The access point 102 can transmit the updated connection information in a next beacon interval to all the WLAN devices in the BSS 100. The WLAN devices, in turn, can update their respective connection information tables to add new WLAN devices, remove WLAN devices that have left the BSS, etc.

Lastly, although FIGS. 1-4 depict a 1-bit direct connect flag having two valid values—one that indicates ability to directly receive data frames and the other that indicates inability to directly receive data frames, embodiments are not so limited. In some implementations, the direct connect flag can comprise two or more bits and can be associated with more than two valid values. A first value of the direct connect flag (e.g., value 01) can indicate that the WLAN device can directly receive data frames from another WLAN device. A second value of the direct connect flag (e.g., value 00) can indicate that the WLAN device cannot directly receive data frames from another WLAN device (i.e., the data frames can be received via an access point). A third value of the direct connect flag (e.g., value 11) can indicate that a direct connect status of the WLAN device is unknown. For example, if the access point 102 does not know whether the WLAN device can directly receive data frames from another WLAN device, the access point 102 may transmit the third value of the direct connect flag as part the connection information associated with the WLAN device. If a source WLAN device 104 detects the third value of the direct connect flag associated with a destination WLAN device 110, the source WLAN device 104 can attempt to directly communicate with the destination WLAN device 110. If direct communication is successful, the source WLAN device 104 can update the connection information table to indicate that data frames can be directly transmitted to the destination WLAN device 110. If direct communication fails, the source WLAN device 104 can update the connection information table to indicate that data frames cannot be directly transmitted to the destination WLAN device 110. In some implementations, the source WLAN device 104 may also notify the access point 102 of whether or not data frames can be directly transmitted to the destination WLAN device 110. The access point 102 can update its connection information and transmit the updated connection information at a next beacon interval.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a non-transitory machine-readable storage medium, or a transitory machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical or other form of propagated signal (e.g., carrier waves, infrared signals, digital signals, etc.). Program code embodied on a machine-readable medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 5:
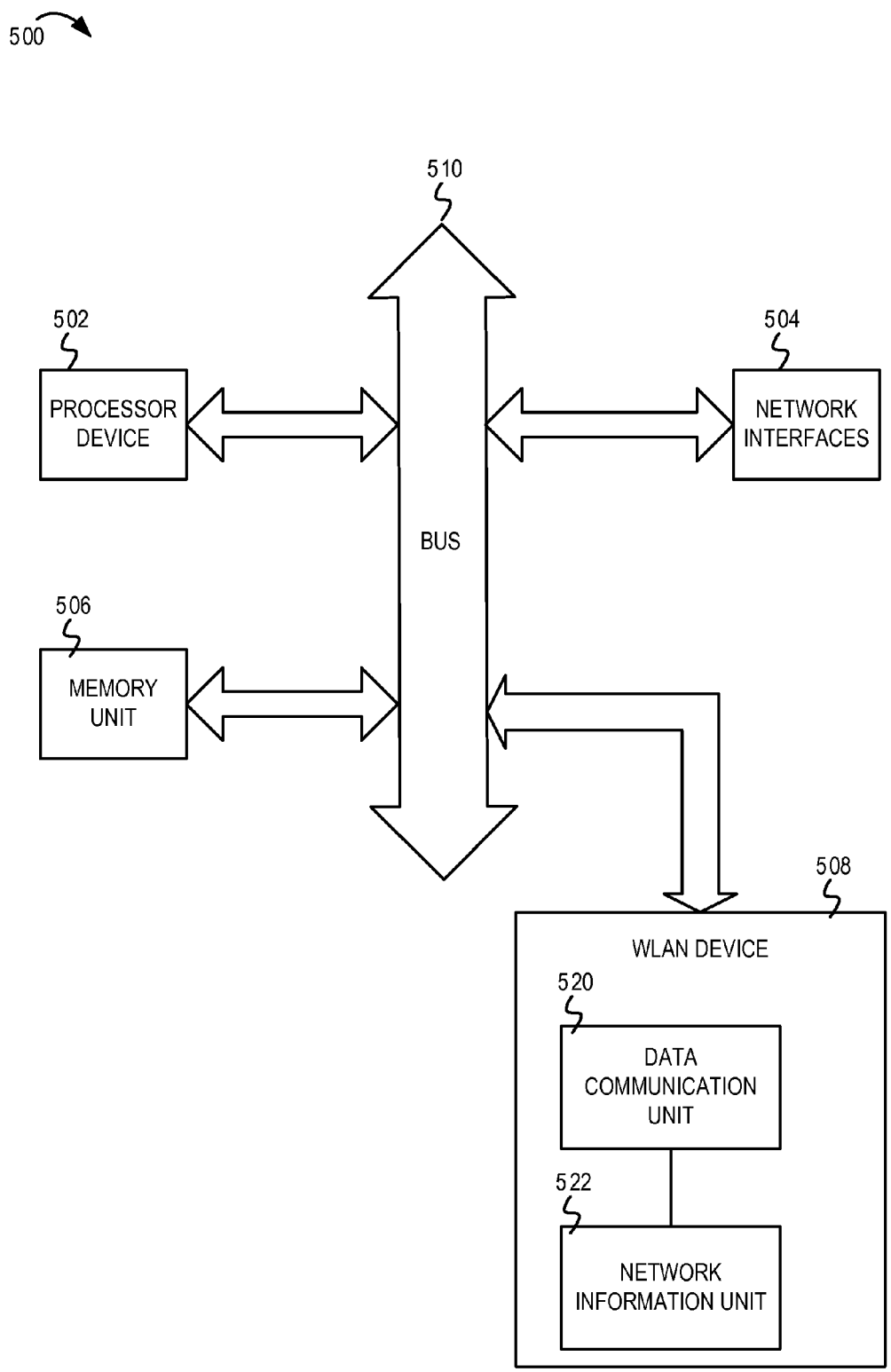
FIG. 5 is a block diagram of one embodiment of an electronic device including a mechanism for direct data communication in an infrastructure WLAN.

FIG. 5 is a block diagram of one embodiment of an electronic device 500 including a mechanism for direct data communication in an infrastructure WLAN. In some implementations, the electronic device 500 may be one of a personal computer (PC), a laptop, a netbook, a mobile phone, a personal digital assistant (PDA), or other electronic systems comprising a WLAN device. The electronic device 500 includes a processor device 502 (possibly including multiple processors, multiple cores, multiple nodes, and/or implementing multi-threading, etc.). The electronic device 500 includes a memory unit 506. The memory unit 506 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 500 also includes a bus 510 (e.g., PCI, ISA, PCI-Express, HyperTransport®, InfiniBand®, NuBus, etc.), and network interfaces 504 that include at least one wireless network interface (e.g., a WLAN interface, a Bluetooth® interface, a WiMAX interface, a ZigBee® interface, a Wireless USB interface, etc.).

The electronic device 500 also includes a WLAN device 508. The WLAN device 508 comprises a data communication unit 520 coupled to a network information unit 522. The network information unit 522 implements functionality for determining whether data frames can be directly transmitted to a destination WLAN device based on determining a status of a direct connect flag associated with the destination WLAN device, as described above with reference to FIGS. 1-4. The data communication unit 520 can transmit the data frames directly to the destination WLAN device or via an access point based on indications from the network information unit 522, as described above with reference to FIGS. 1-4. It should be noted that any one of the above-described functionalities might be partially (or entirely) implemented in hardware and/or on the processor device 502. For example, the functionality may be implemented with an application specific integrated circuit, in logic implemented in the processor device 502, in a co-processor on a peripheral device or card, etc. Further, realizations may include fewer or additional components not illustrated in FIG. 5 (e.g., additional network interfaces, peripheral devices, etc.). The processor device 502 and the network interfaces 504 are coupled to the bus 510. Although illustrated as being coupled to the bus 510, the memory unit 506 may be coupled to the processor device 502.

While the embodiments are described with reference to various implementations and exploitations, it will be understood that these embodiments are illustrative and that the scope of the inventive subject matter is not limited to them. In general, techniques for direct data communication in an infrastructure WLAN as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for operating a first device in a network, the method comprising:
   determining that a first data frame can be directly transmitted from the first device to a second device based, at least in part, on connection information, wherein
      the first device and the second device are communicatively coupled to the network using an infrastructure mode, and
      the connection information is included in a beacon frame received from an access point of the network during a beacon interval;
   transmitting the first data frame directly from the first device to the second device in response to determining that the first data frame can be directly transmitted to the second device;
   determining that an acknowledgement frame associated with transmission of the first data frame was not received from the second device; and
   updating a first flag to indicate that the first data frame cannot be directly transmitted to the second device.

2. The method of claim 1, wherein the connection information includes the first flag that indicates whether the first data frame can be directly transmitted to the second device.

3. The method of claim 1, further comprising:
   retransmitting the first data frame to the second device based, at least in part, on determining that the acknowledgement frame was not received.

4. The method of claim 3, wherein retransmitting the first data frame to the second device is further based on determining at least one member selected from a group consisting of an expiration of a retransmission time interval and a maximum number of attempted retransmissions.

5. The method of claim 1, wherein determining that the first data frame can be directly transmitted to the second device comprises:
   determining a device identifier associated with the second device; and
   identifying the connection information based, at least in part, on the device identifier.

6. The method of claim 1, further comprising:
   receiving a second data frame from a third device;
   determining that the first device and the third device are part of the network based, at least in part, on the connection information;
   determining that the second data frame was directly received from the third device; and
   updating a second flag to indicate that data frames can be directly transmitted from the third device to the first device.

7. The method of claim 1, wherein
   the network is a wireless local area network (WLAN), and
   the first device and the second device are wireless devices.

8. The method of claim 1, wherein determining that the first data frame can be directly transmitted to the second device comprises:
   determining that the first flag has a value indicating that data frames can be directly transmitted from the first device to the second device.

9. A first device comprising:
   a processor;
   a network interface; and
   a memory coupled to the processor, the memory storing instructions which, when executed by the processor, cause the first device to,
      receive a beacon frame from an access point transmitted during a beacon interval, and
      determine that a data frame can be directly transmitted from the first device to a second device, based, at least in part, on connection information included in the beacon frame, wherein
         the first device and the second device are communicatively coupled together to a network using an infrastructure mode;
      transmit the data frame directly from the first device to the second device in response to determining that the data frame can be directly transmitted to the second device; and
      determine that an acknowledgement frame associated with transmission of the data frame was not received from the second device.

10. The first device of claim 9, wherein the connection information includes a flag that indicates whether the data frame can be directly transmitted to the second device.

11. The first device of claim 9, wherein the instructions, when executed by the processor, further cause the first device to update a flag to indicate that the data frame cannot be directly transmitted to the second device.

12. The first device of claim 9, wherein the instructions, when executed by the processor, further cause the first device to retransmit the data frame to the second device based, at least in part, on determining that the acknowledgement frame was not received.

13. The first device of claim 12, wherein the instructions, when executed by the processor, cause the first device to retransmit the data frame further based on determining at least one member selected from a group consisting of an expiration of a retransmission time interval and a maximum number of attempted retransmissions.

14. A non-transitory machine-readable storage medium having machine executable instructions stored therein, the machine executable instructions comprising instructions to:
   determine, at a first device, that a first data frame can be directly transmitted from the first device to a second device based, at least in part, on connection information, wherein
      the connection information is included in a beacon frame received from an access point transmitted during a beacon interval, and
      the first device and the second device are communicatively coupled to a network using an infrastructure mode;
   transmit the first data frame directly from the first device to the second device in response to determining that the first data frame can be directly transmitted to the second device;
   determine that an acknowledgement frame associated with transmission of the first data frame was not received from the second device; and
   update a flag to indicate that the first data frame cannot be directly transmitted to the second device.

15. The non-transitory machine-readable storage medium of claim 14, wherein the connection information included in the beacon frame includes a flag that indicates whether the first data frame can be directly transmitted to the second device.

16. The non-transitory machine-readable storage medium of claim 14, further comprising instructions to:
   retransmit the first data frame to the second device based, at least in part, on determining that the acknowledgement frame was not received, wherein
      retransmitting the first data frame is further based on determining at least one member selected from a group consisting of an expiration of a retransmission time interval and a maximum number of attempted retransmissions.

17. The non-transitory machine-readable storage medium of claim 14, further comprising instructions to:
   receive a second data frame from a third device;
   determine that the first device and the third device are part of the network based, at least in part, on the connection information;
   determine that the second data frame was directly received from the third device; and
   update a flag to indicate that data frames can be directly transmitted from the third device to the first device.

18. A method for operating a first device in a network, the method comprising:
   determining that a first data frame can be directly transmitted from the first device to a second device based, at least in part, on connection information, wherein
      the first device and the second device are communicatively coupled to the network using an infrastructure mode, and
      the connection information is included in a beacon frame received from an access point of the network during a beacon interval;
   receiving a second data frame from a third device;
   determining that the first device and the third device are part of the network that uses the infrastructure mode based, at least in part, on the connection information;
   determining that the second data frame was directly received from the third device; and
   updating a flag to indicate that data frames can be directly transmitted from the third device to the first device.

19. A non-transitory machine-readable storage medium having machine executable instructions stored therein, the machine executable instructions comprising instructions to:
   determine, at a first device, that a first data frame can be directly transmitted from the first device to a second device based, at least in part, on connection information, wherein
      the connection information is included in a beacon frame received from an access point transmitted during a beacon interval, and
      the first device and the second device are communicatively coupled to a network using an infrastructure mode;
   receive a second data frame from a third device;
   determine that the first device and the third device are part of the network that uses the infrastructure mode based, at least in part, on the connection information;
   determine that the second data frame was directly received from the third device; and
   update a flag to indicate that data frames can be directly transmitted from the third device to the first device.

* * * * *